United States Patent
Gines

(10) Patent No.: US 8,098,200 B1
(45) Date of Patent: Jan. 17, 2012

(54) METHOD AND SYSTEM FOR LOCATING SIGNAL EMITTERS USING RESIDUAL VALUES

(75) Inventor: David L. Gines, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 335 days.

(21) Appl. No.: 12/539,760

(22) Filed: Aug. 12, 2009

Related U.S. Application Data

(63) Continuation-in-part of application No. 12/407,535, filed on Mar. 19, 2009, now abandoned, which is a continuation of application No. 12/402,835, filed on Mar. 12, 2009, now abandoned.

(51) Int. Cl.
*G01S 3/02* (2006.01)

(52) U.S. Cl. .................. 342/465; 342/451

(58) Field of Classification Search .......... 342/463–465, 342/387, 444, 451
See application file for complete search history.

(56) References Cited

U.S. PATENT DOCUMENTS

| | | | |
|---|---|---|---|
| 3,659,085 A | 4/1972 | Potter et al. | |
| 4,806,936 A | 2/1989 | Williams et al. | |
| 6,407,703 B1 * | 6/2002 | Minter et al. | 342/465 |
| 7,737,893 B1 * | 6/2010 | Furman et al. | 342/451 |
| 2002/0080069 A1 | 6/2002 | Stilp et al. | |
| 2005/0114034 A1 | 5/2005 | Bagaini | |
| 2006/0250264 A1 | 11/2006 | Cutler et al. | |
| 2007/0111746 A1 | 5/2007 | Anderson | |
| 2007/0139269 A1 | 6/2007 | Chen et al. | |
| 2010/0138184 A1 * | 6/2010 | Fernandez et al. | 702/150 |

FOREIGN PATENT DOCUMENTS

WO 2008/051204 A2 5/2008

OTHER PUBLICATIONS

Pi-Chun Chen; "A non-line-of-sight error mitigation algorithm in location estimation," IEEE Wireless Communications and Networking Conference, vol. 1, Publication Year: 1999, pp. 316-320.

Djuknic, G.M.; Richton, R.E. Geolocation and Assisted-GPS. White Paper, Mobility: 3G-CDMA2000 & UMTS, Lucent Technologies, Bell Labs, May 2002.

J.M. Huerta et al., "Joint Particle Filter and UKF Position Tracking in Severe Non-Line-of-Sight Situations," IEEE Journal of Selected Topics in Signal Processing, vol. 3, Issue: 5, Publication Year: 2009, pp. 874-888.

(Continued)

*Primary Examiner* — Thomas Tarcza
*Assistant Examiner* — Fred H Mull

(57) ABSTRACT

A method and system determine a location of an emitter using at least three sensors, each receiving a signal from the emitter. Cross-correlation data is determined for the received signals at sensor pairs, and one or more peaks are identified in the cross-correlation data. A likelihood function is determined for each sensor pair. A total likelihood function is determined for the sensors using the likelihood functions for each sensor pair, and the location of the emitter is determined as the point where the total likelihood function is maximized. The individual likelihood function for each sensor pair can be determined by selecting, at each point in a grid, a peak in the cross-correlation data that generates a minimum residual according to a minimum residual criterion, and using the selected peak in the cross-correlation data for each point in the grid to calculate the likelihood function.

20 Claims, 14 Drawing Sheets

OTHER PUBLICATIONS

Mikhalev et al., "Comparison of Hough Transform and Particle Filter Methods of Emitter Geolocation using Fusion of TDOA Data", 4th Workshop on Positioning, Navigation and Communication, 2007. WPNC '07. Mar. 22-22, 2007 pp. 121-127.
http://en.wikipedia.org/wiki/Multilateration.
http://en.wikipedia.org/wiki/Trilateration.
http://en.wikipedia.org/wiki/Angle_of_Arrival.
http://en.wikipedia.org/wiki/Received_Signal_Strength_Indication.
Knapp et al. "The generalized correlation method for estimation of time delay", IEEE Transactions on Acoustics, Speech and Signal Processing, vol. 24, Issue 4, Aug. 1976 pp. 320-327.
Pahlavan et al. "Indoor geolocation science and technology", IEEE Communications Magazine vol. 40, Issue 2, Feb. 2002 pp. 112-118.
Huang et al., "Adaptive blind channel identification: multi-channel least mean square and Newton algorithms", IEEE International Conference on Acoustics, Speech, and Signal Processing, 2002. Proceedings. (ICASSP '02), vol. 2, 2002, pp. 1637-1640.

* cited by examiner

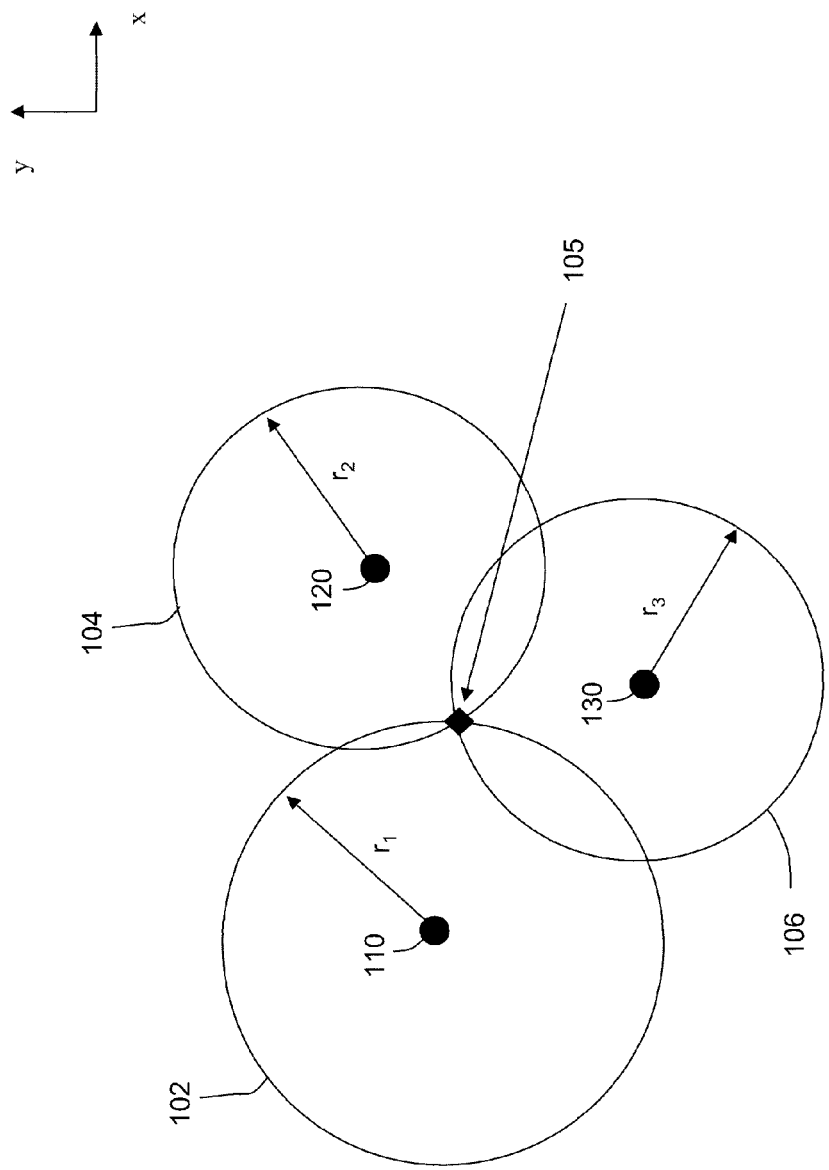

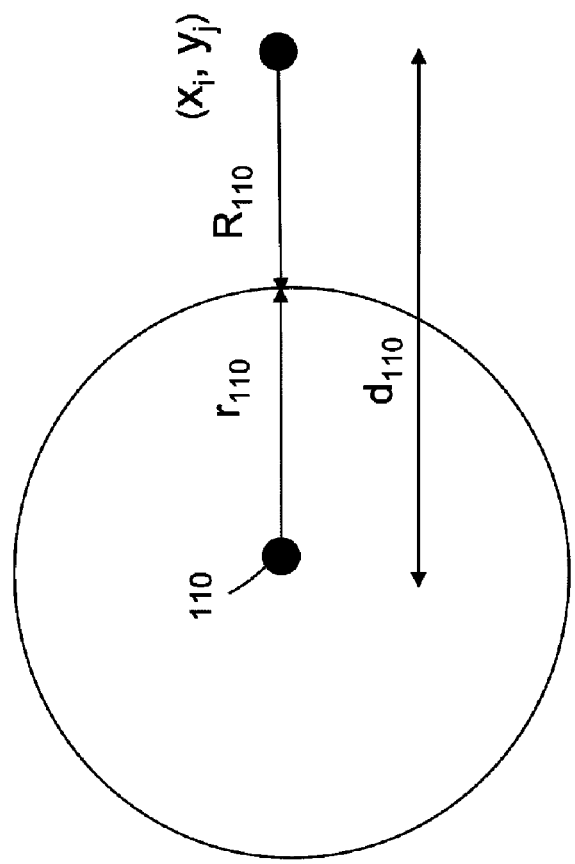
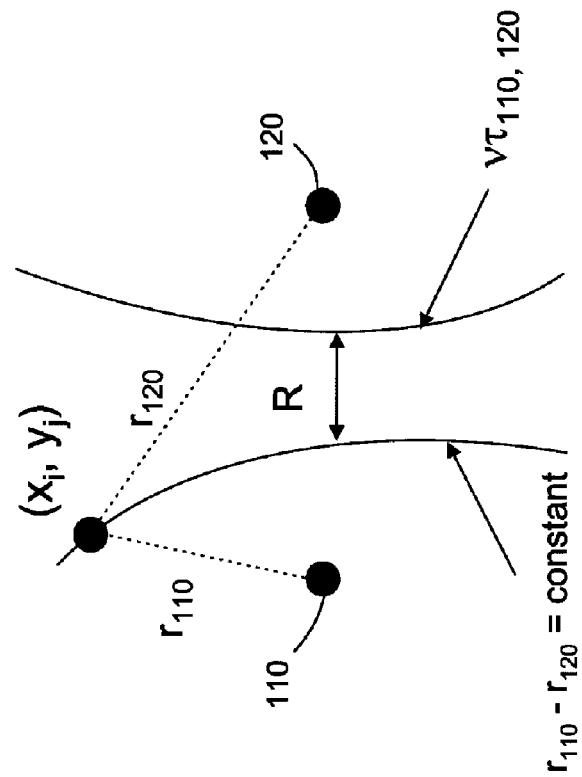
FIG. 7B
FIG. 7A

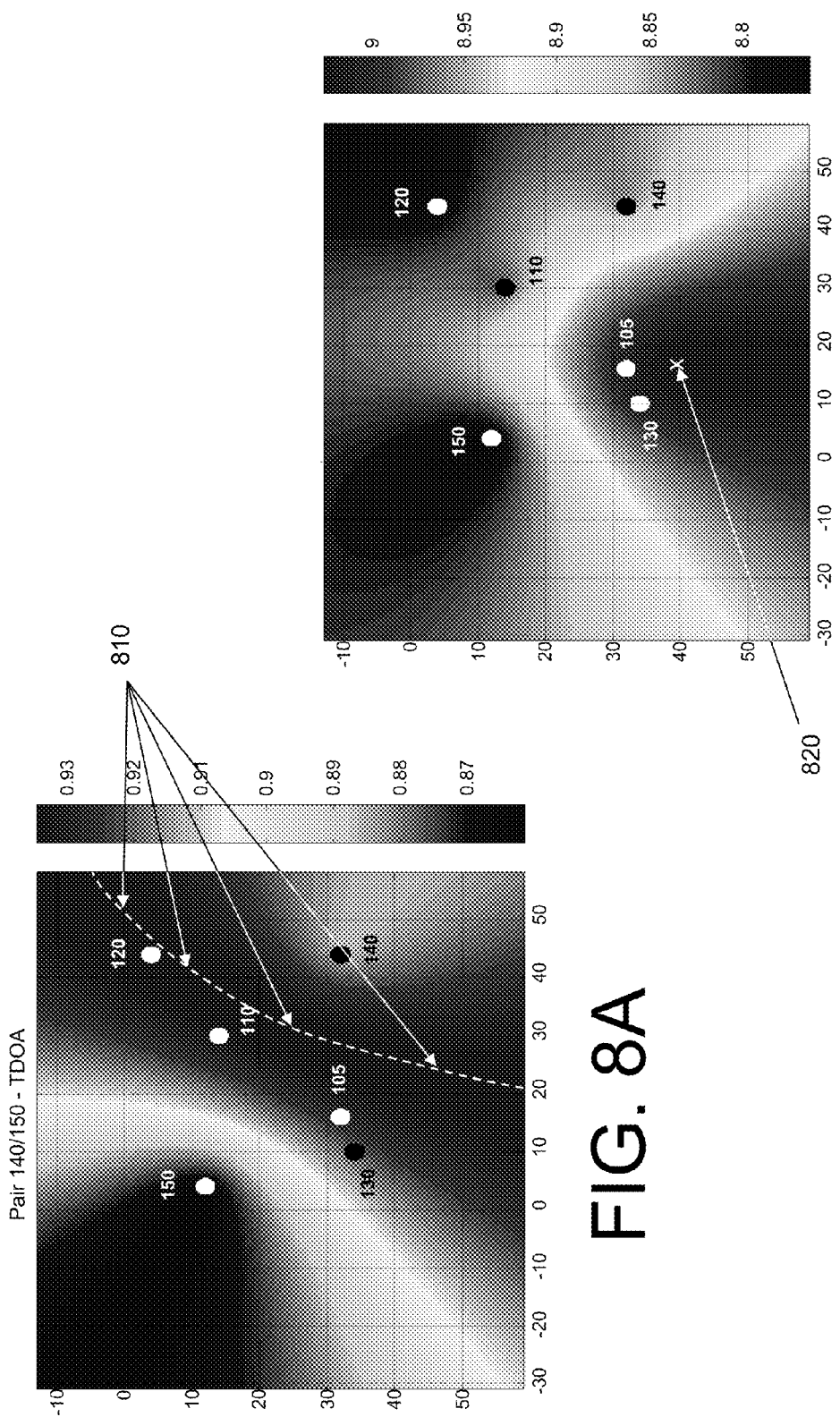

METHOD AND SYSTEM FOR LOCATING SIGNAL EMITTERS USING RESIDUAL VALUES

CROSS-REFERENCE TO RELATED APPLICATIONS

This application is a continuation-in-part of application Ser. No. 12/407,535 filed on 19 Mar. 2009 which is in turn a continuation of application Ser. No. 12/402,835 filed on 12 Mar. 2009, both of which are hereby incorporated for all purposes as if fully set forth herein.

BACKGROUND

There are a number of applications where it is desirable to be able to identify an unknown location of an object which emits a signal. One example occurs when planning an indoor wireless local area network (LAN) having one or more RF or microwave emitters.

Of course precisely defining an object's location requires specifying coordinates in three dimensions (e.g., longitude, latitude, and altitude). In the discussion to follow, for simplicity of explanation it is assumed that the third coordinate (i.e., altitude) is either known or is otherwise easily determined once the other two coordinates (e.g., latitude and longitude) are identified. Those skilled in the art will be able to extrapolate the discussion to follow to the case where all three coordinates are to be determined.

There are a few known methods to locate signal emitters using a plurality of distributed sensors, or receivers, which are spaced apart from each other. Among these methods are: Angle of Arrival (AOA), Time of Arrival (TOA), Time Difference of Arrival (TDOA), and Received Signal Strength (RSS).

In the AOA method, the angle of arrival of the signal is measured with special directional antennas at each receiver. This information is combined to help locate the signal emitter using lines of bearing.

In the TOA method, a signal emitter transmits a signal at a predetermined or known time. Three or more sensors each measure the arrival time of the signal at that sensor. The absolute propagation time between emitter and sensor defines a distance or range. The range is computed using the well-known relation, r=vt, where r is the range, v is the propagation velocity, and t is the time of propagation between emitter and sensor. The known time of arrival at each sensor leads to circles of constant received time, centered at that sensor.

FIG. 1 illustrates some principles of a TOA method of locating an emitter 105 using three sensors 110, 120 and 130. Shown in FIG. 1 are three range-defined circles 102, 104 and 106 for the three sensors 110, 120 and 130, having respective radii r1, r2 and r3. The location where the circles 102, 104 and 106 from the three sensors 110, 120 and 130 intersect as shown in FIG. 1 is the most likely location of the signal emitter 105. In general, at least three sensors are required for the TOA method, but more than three sensors can be employed.

A chief limitation of the TOA method is that the emitter(s) to be located and the sensors must be synchronized.

The TDOA method, also known sometimes as multilateration or hyperbolic positioning, is a process of locating an emitter by accurately computing the time difference of arrival at three or more sensors of a signal emitted from an emitter to be located. In particular, if a signal is emitted from a signal emitter, it will arrive at slightly different times at two spatially separated sensor sites, the TDOA being due to the different distances to each sensor from the emitter. For given locations of the two sensors, there is a set of emitter locations that would give the same measurement of TDOA. Given two known sensor locations and a known TDOA between them, the locus of possible locations of the signal emitter lies on a hyperbola. As shown in FIG. 2A, the hyperbola is defined as the locations where the difference between distances to the two sensors is a constant, or, in this case:

$$r_1 - r_2 = v(t_1 - t_2).$$

With three or more sensors, multiple hyperbolas can be constructed from the TDOAs of different pairs of sensors. The location where the hyperbolas generated from the different sensor pairs intersect is the most likely location of the signal emitter. In practice, the sensors are time synchronized and the difference in the time of arrival of a signal from a signal emitter at a pair of sensors is measured.

FIG. 2B illustrates some principles of a TDOA method of locating an emitter 105 using three sensors 110, 120 and 130. Shown in FIG. 2 are three range-defined hyperbolas 202, 204 and 206 for the three sensor pairs 110/120, 110/130 and 120/130. The location where the hyperbolas 202, 204 and 206 from the three sensor pairs intersect, as shown in FIG. 2B, is the most likely location of the signal emitter 105. In general, at least three sensors are required for the TDOA method, but more than three sensors can be employed.

In many cases, the time-difference of arrival of a signal at two sensors is difficult to measure since the timing and signal characteristics of the emitter are unknown. In those cases, cross-correlation is a common method for determining the delay $\tau$. FIG. 3 shows an example cross-correlation curve 310. The time-difference of arrival between the two sensors is defined as the location 312 where the curve 310 has its maximum.

In the RSS method, the power of the received signal at each sensor is measured, and the signal strength information is processed to help locate the signal emitter. There are a few different emitter location procedures that employ RSS.

In a basic RSS procedure, the power of the signal received at each sensor is measured. By knowing the broadcast power of the emitter, $P_0$, one can convert the received power level, $P_1$, to a range using the idealized expression: $P_1 = P_0 * r_1^{-2}$. Other variants of this equation use statistical approaches to account for varieties in terrain. The range from each sensor defines a circle of probable locations for the emitter, centered at that receiver, similar to what is shown in FIG. 1.

Another form of RSS is a relative power measurement, used when the power level of the signal transmitted at the emitter is not known. In this approach the relative signal power is measured at a pair of two sensors, and the received power levels at the sensors are processed to determine a circle of probable locations for the emitter.

A more detailed explanation of principles employed in such an RSS method of locating a signal emitter will now be provided with respect to FIG. 4.

FIG. 4 illustrates a general case of an emitter 105 and two sensors 110 and 120 which each receives a signal from emitter 105 wherein a circle 402 of probable locations for emitter 105 is determined from a ratio the received signal powers at sensors 110 and 120.

In free space, the received power of a signal transmitted by emitter 105 decreases with the square of the distance from emitter 105.

$$P_1 = P_0 \left(\frac{r_0}{r_1}\right)^2, \tag{1}$$

where $r_1$ is the distance between emitter 105 and first sensor 110, and 2 is the exponential rate at which the power decreases with distance.

Likewise the received power $P_2$ at second sensor 120 is:

$$P_2 = P_0 \left(\frac{r_0}{r_2}\right)^2, \quad (2)$$

where $r_2$ is the distance between emitter 105 and second sensor 120.

This leads to:

$$\frac{P_1}{P_2} = \left(\frac{r_2}{r_1}\right)^2 \quad (3)$$

With a bit of manipulation this yields:

$$\frac{\log(P_1) - \log(P_2)}{2} = \frac{r_2}{r_1} = \text{const} = \alpha \quad (4)$$

This method is sometimes referred to as Signal Attenuation Difference of Arrival (SADOA). It can be shown that this leads to the circle 402 (the so-called circle of Apollonius) of a given radius R and centered on a point $X_0, Y_0$ located on the line 401 defined by the two sensors 110 and 120. This relationship is illustrated in FIG. 4.

With at least three sensors (e.g., A, B & C), three such circles are generated from the corresponding three unique pairs of sensors (e.g., A/B, A/C & B/C), and the location of emitter 100 can be found where the three circles intercept.

However, the addition of measurement uncertainty and noise makes it difficult to locate a sensor analytically with a high degree of accuracy using the AOA, TOA, TDOA, and RSS techniques as described above. Several error factors affect the accuracy of measurements made by the sensors. These error factors may include:

Noise. In low Signal-to-noise ratio (SNR) situations, emitter location is more difficult to determine with a high degree of accuracy because measurements of signal power, time-of-arrival, etc. are affected.

Timing and calibration errors. Although these errors are typically small compared to other errors described here, there is nevertheless a need for algorithms that are robust in instances where these errors are significant.

Competing emitters. Signals from multiple emitters can lead to ambiguous results.

Multipath propagation. Reflections from multipath propagation can distort or obscure the true time of arrival, angle of arrival, or strength of a signal received at a sensor.

Blocked line-of-sight, or un-detected direct path (UDP), is a condition in which the main propagation path between the emitter and receiver is blocked.

Some or all of these errors can affect the graphical depictions in FIGS. 1 & 2, causing the circles or hyperbolas to move so that they do not all intersect at a single point.

The effect of all of these errors is illustrated in the example shown in FIG. 5.

FIG. 5 illustrates a TOA method of locating an emitter 105 using three sensors 110, 120 and 130 in the presence of one or more of the factors listed above. Shown in FIG. 5 are three range-defined circles 502, 504 and 506 for the three sensors 110, 120 and 130, having respective radii r1, r2 and r3. Because of measurement uncertainty due to one or more of the error-generating factors described above, the three circles 502, 504 and 506 do not intersect at one point. Instead, the three circles define an overlap region 505 which may be considered a most likely region for the location of emitter 105. It can be understood that as the measurement uncertainty increases due to various factors described above, the size of the overlap region 505 may increase to such a degree that the emitter's location cannot be determined to a desired level of accuracy.

Thus, more robust methods of locating an emitter are required to obtain a more accurate solution.

What is needed, therefore, is a method and system for locating signal emitters that addresses one or more of these shortcomings.

SUMMARY

In an example embodiment, a method is provided for determining the location of a signal emitter. The method includes: providing at least three sensors separated and spaced apart from each other; receiving a signal from the emitter at each of the sensors; determining cross-correlation data for the received signals at sensor pairs; identifying peaks in the cross-correlation data for each of the sensor pairs; for each sensor pair: selecting, at each point in a grid, a peak in the cross-correlation data that generates a minimum residual according to a selected minimum residual criterion, and using the selected peak in the cross-correlation data for each point in the grid to calculate a likelihood function for the sensor pair; determining a total likelihood function for the sensors using the likelihood functions for each sensor pair; and determining the location of the emitter as a point where the total likelihood function has a maximum value.

In another example embodiment, a method is provided for determining the location of a signal emitter. The method includes: providing at least three sensors separated and spaced apart from each other; receiving a signal from the emitter at each of the sensors; determining cross-correlation data for the received signals at sensor pairs; identifying peaks in the cross-correlation data for each of the sensor pairs; determining a combination of the peaks from the cross-correlation data for the sensor pairs that produces a minimum total residual; determining a likelihood function for each sensor pair using the selected peak from the cross-correlation data; determining a total likelihood function for the sensors using the likelihood functions for each sensor pair; and determining the location of the emitter as a point where the total likelihood function has a maximum value.

In another example embodiment, a system is provided for determining a location of a signal emitter. The system comprises: at least three sensors separated and spaced apart from each other, each of the sensors including a receiver adapted to receive the signal emitted by the first device; a network connecting the sensors and adapted to communicate data from the sensors; and a processor programmed to execute an algorithm. The algorithm comprises: determining cross-correlation data for signals at sensor pairs, identifying peaks in the cross-correlation data for each of the sensor pairs, determining an individual likelihood function for each sensor pair based on the cross-correlation data, determining a total likelihood function for the sensors using the individual likelihood functions for each sensor pair, and determining the location of the emitter as a point where the total likelihood function has a maximum value. The individual likelihood function for each sensor pair is determined by one of: (1) at each point in a grid, selecting a peak in the cross-correlation data for the sensor pair that generates a minimum residual according to a selected minimum residual criterion, and determining the likelihood function for each sensor pair using the selected peak in the cross-correlation data for each point in the grid; and (2) determining a combination of the peaks from the cross-correlation data for the sensor pairs that produces a minimum total residual, and determining a likelihood function for each sensor pair using the selected peak from the cross-correlation data.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 1 illustrates a time of arrival (TOA) algorithm for determining the location of a signal emitter.

FIG. 7A illustrates a residual value for estimated location data in the case of a system that generates hyperbolic likelihood curves.

FIG. 7B illustrates a residual value for estimated location data in the case of a system that generates circular likelihood curves.

FIG. 8A illustrates a graphical plot of estimated location data (a likelihood plot) for an emitter calculated for one sensor pair.

FIG. 8B illustrates a graphical plot of combined estimated location data (a likelihood plot) for an emitter calculated for ten sensor pairs.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 6:
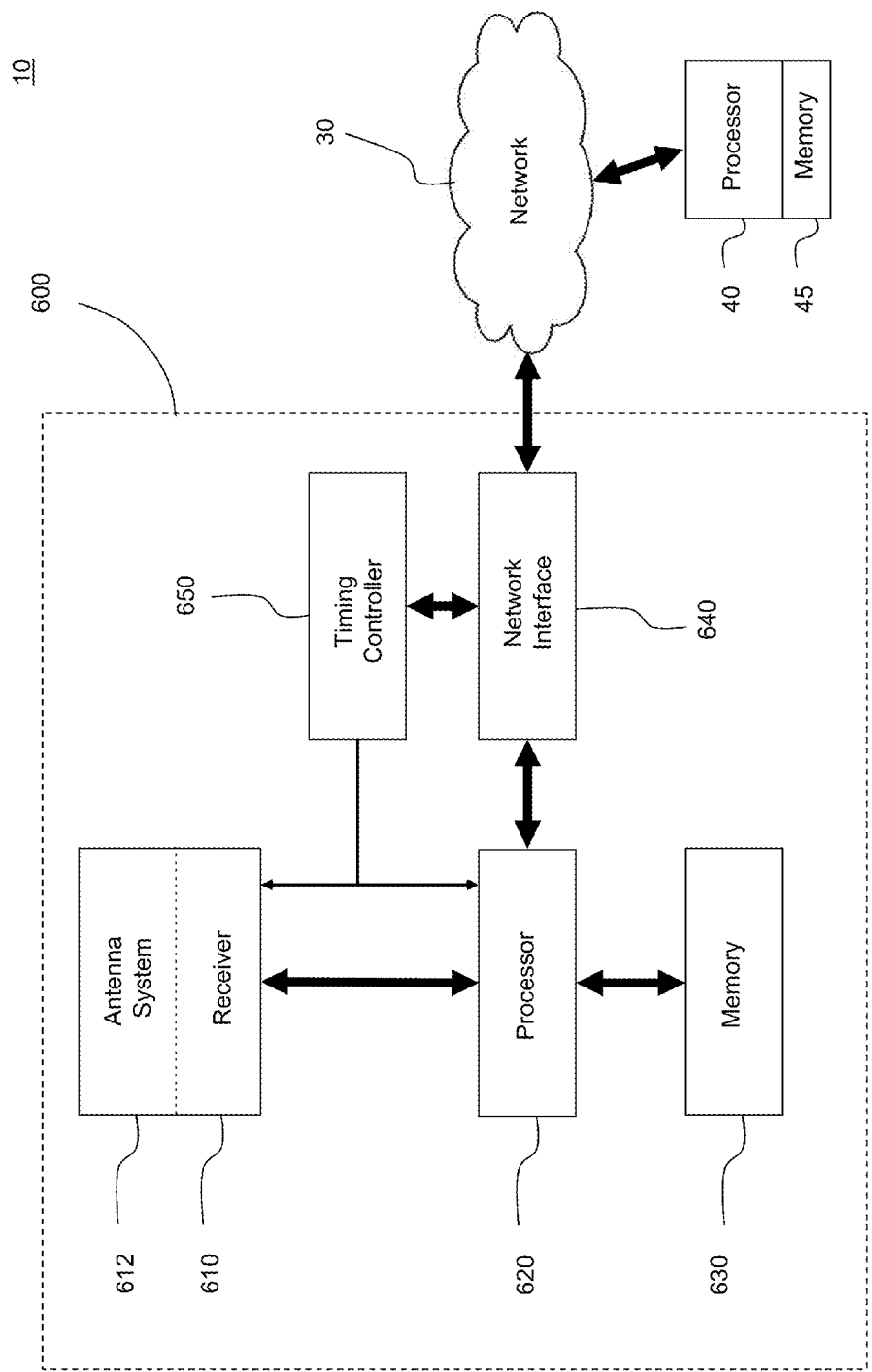
FIG. 6 illustrates shows a functional block diagram of one embodiment of a sensor that may be employed in a system for locating a signal emitter.

FIG. 6 shows a functional block diagram of one embodiment of a sensor 600 that may be employed in a geolocation system 10 for locating signal emitters. As will be appreciated by those skilled in the art, one or more of the various "parts" shown in FIG. 6 may be physically implemented using a software-controlled microprocessor, hard-wired logic circuits, or a combination thereof. Also, while the parts are functionally segregated in FIG. 6 for explanation purposes, they may be combined variously in any physical implementation.

Sensor 600 includes a receiver 610, a processor 620, a memory 630, a network interface 640, and a timing controller 650. In some embodiments, receiver 610 includes, or is connected to, an antenna system 612. In some embodiments, antenna system 612 may comprise a directional antenna system.

Receiver 610 provides functionality for sensor 600 to receive and process a signal (e.g., an RF signal, a microwave signal, an acoustic signal, etc.) received from a signal emitter. In some embodiments, receiver 610 is able to simultaneously receive signals from a plurality of different signal emitters.

Processor 620 is configured to execute one or more software algorithms in conjunction with memory 630 to provide functionality for sensor 600. Beneficially, processor 620 includes its own memory (e.g., nonvolatile memory) for storing executable software programming code that allows it to perform the various functions of sensor 300. Alternatively, or additionally, executable code may be stored in designated memory locations within memory 630.

Memory 630 stores data and/or software programming code used in operations of sensor 600.

Network interface 640 interfaces sensor 600 to a network 30 that includes a plurality of other sensors 600. By means of network 30, sensors 600 may share or communicate information with each other, and/or to a central controller or processor 40 and/or associated memory 45 that may be connected via network 30.

Timing controller 650 controls the timing of signal processing operations in sensor 600. In a beneficial arrangement, sensor 600 shares timing information with other sensors (not shown in FIG. 6) in network 30 via network interface 640. In one embodiment, timing controllers 650 of sensors 600 in network 30 are synchronized with each other to have a common sense of time. In one embodiment, timing controllers 650 in sensors 600 may obtain a common sense of time via a precision timing protocol (PTP) of IEEE-1588. In such a case, central controller or processor 40 may include a master clock for sensors 600 in network 30, or a separate dedicated master clock may be provided in network 30. In another embodiment, one of the timing controllers 650 in one of the sensors 600 may operate as a master clock for sensors 600 in network 30.

In an alternative embodiment, a sensor that may be employed in a system for locating signal emitters could be a simple probe at the end of a wire or fiber that remotely connects to a central receiver and/or processor.

Now a method and system of locating signal emitters using received signals at three or more sensors such as sensor 600 of FIG. 6 will be explained. In various embodiments, the calculations and other steps described below may be performed by processor 40, by one or more of the processors 620 of sensors 600, or by a combination of processor 40 and processors 620 programmed to execute predetermined instructions which may be, for example, stored in a corresponding memory or memories 45 and/or 630.

Figure 5:
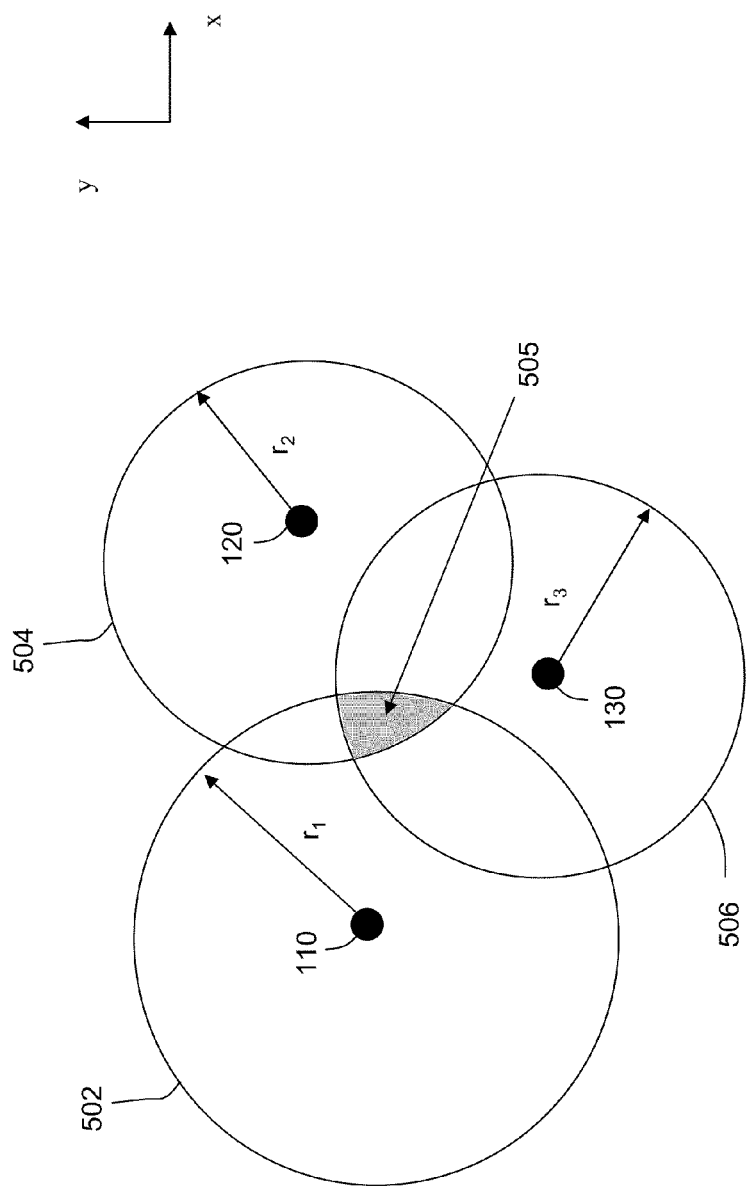
FIG. 5 illustrates a time of arrival (TOA) algorithm for determining the location of a signal emitter in an environment where one or more error-generating factors are present.

Referring back to FIG. 5, statistical methods such as least-squares fitting and maximum likelihood estimates, or more robust graphical methods may be employed to obtain a unique solution for the location of emitter 105.

Robust graphical methods have the advantage of being easy to compute, and easy to interpret. They are performed by converting the hyperbolas to likelihood functions. These functions have maximum likelihood along the defined circle or hyperbola curve (depending on the location method being employed), and gradually declining likelihood away from the curve.

An exemplary embodiment of a robust graphical emitter location method employing likelihood functions will now be explained.

A first step is to define a grid of points $(x_i, y_j)$, $i=1 \ldots N$, $j=1 \ldots M$, at which estimated location data in the form of a likelihood function will be computed. The next step is to generate a likelihood function representing the likelihood of the signal emitter being located at a particular location.

Figures 2A, 2B:
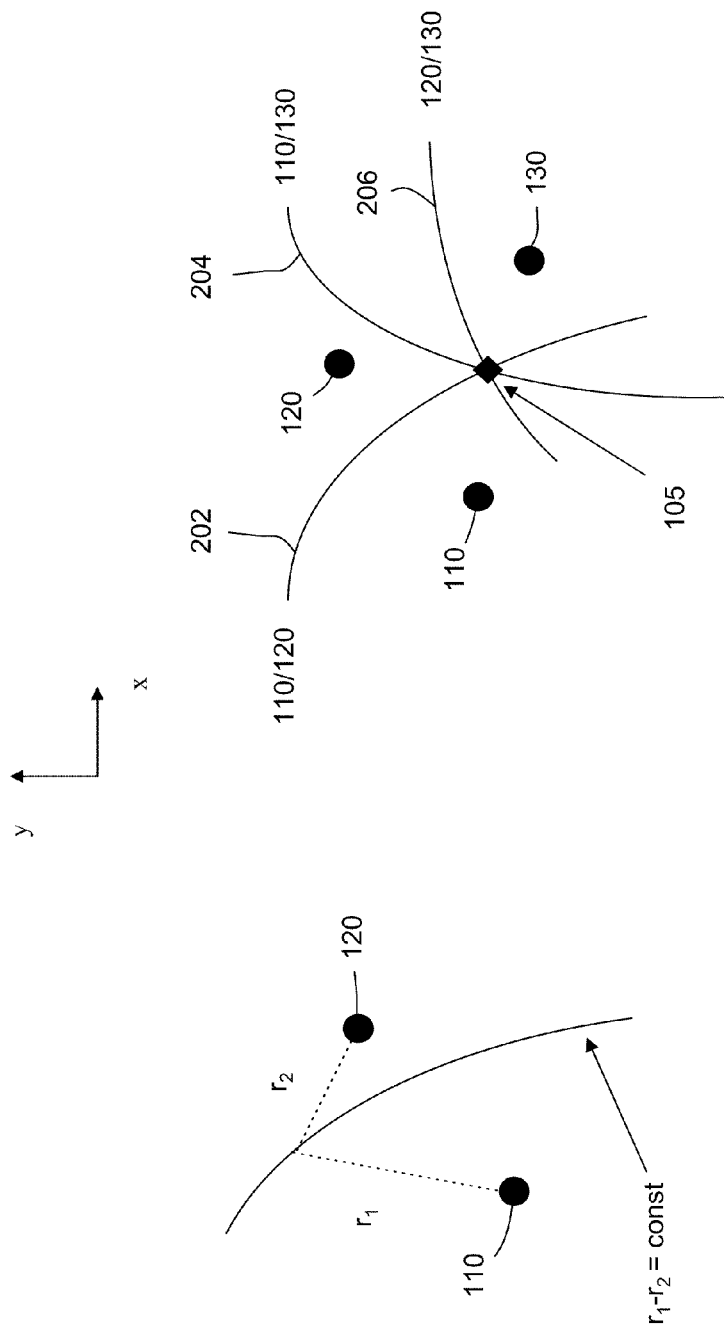
FIGS. 2A-B illustrate a time difference of arrival (TDOA) algorithm for determining the location of a signal emitter.
Figure 3:
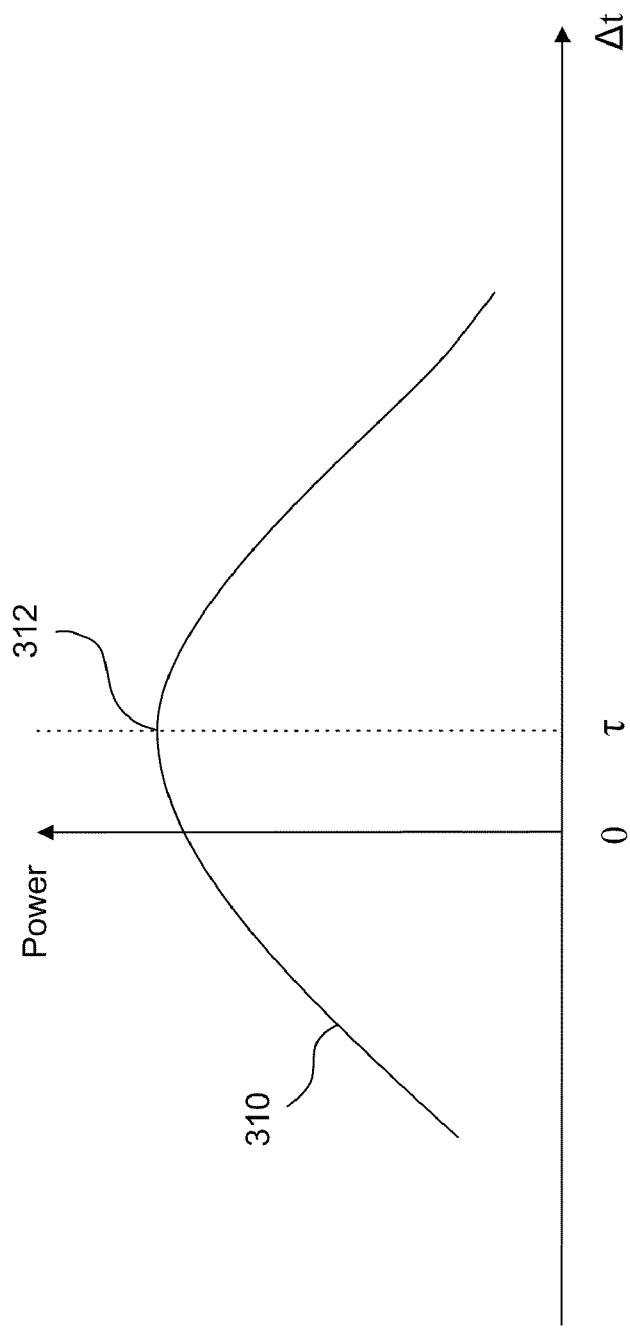
FIG. 3 shows an example of a cross-correlation curve.
Figure 4:
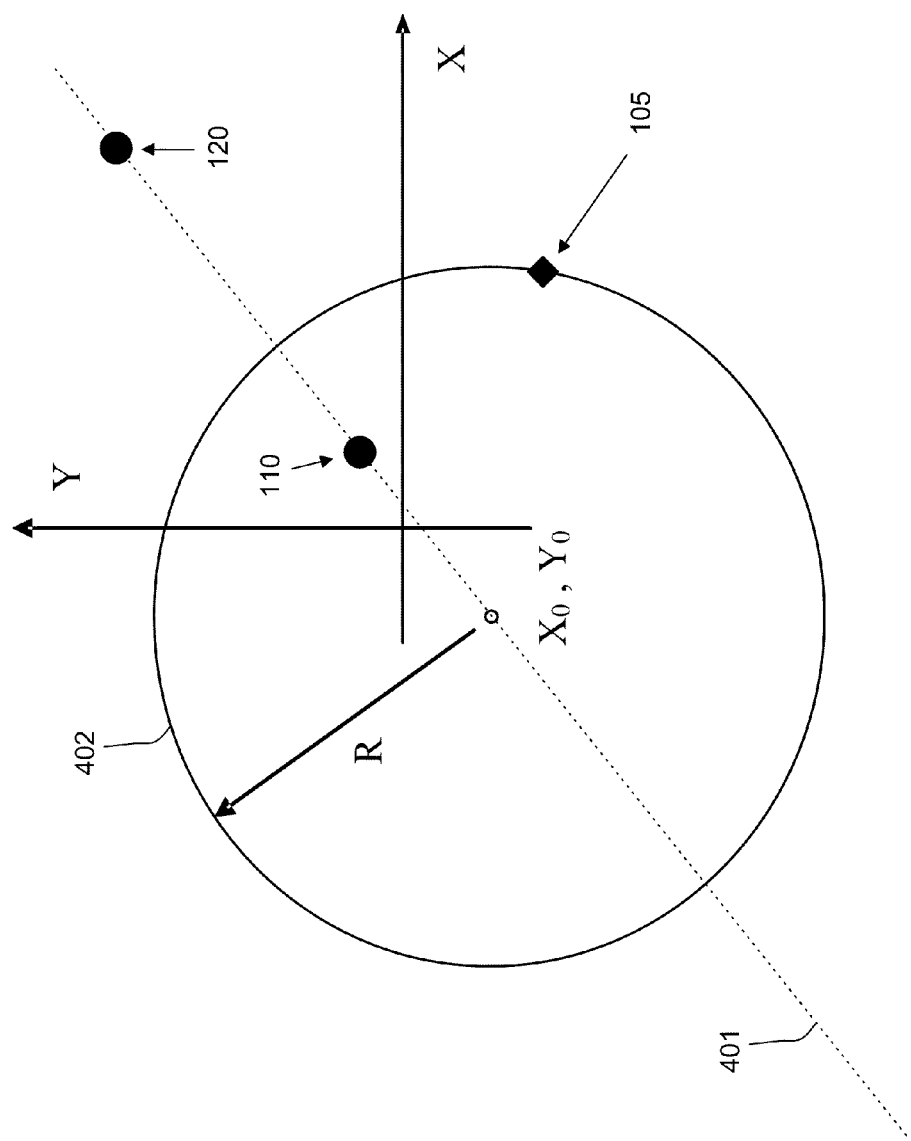
FIG. 4 illustrates a received signal strength (RSS) algorithm for determining the location of a signal emitter.

In one embodiment, the approach is based on computing a residual. In location systems which generate hyperbolas of probable locations for the emitter (e.g., in TDOA systems), a metric is computed which converts the cross-correlation data into a likelihood function. In that case, the residual with respect to first and second sensors 110 and 120 at a point $(x_i, y_j)$ is defined as:

$$R_{110,120} = |(r_{110} - r_{120}) - v\tau_{110,120}|, \quad (5)$$

where v represents the speed of propagation of the signal from the emitter (e.g., the speed of light), where $r_{110}$ and $r_{120}$ are the distances between the point $(x_i, y_j)$ and the first and second sensors 110 and 120 respectively, of the sensor pair, and where $\tau_{110,120}$ is the time-difference of arrival for the two sensors as determined by the location of the peak in the cross-correlation data (see FIG. 3). Graphically, the TDOA residual value for a sensor pair at point $(x_i, y_j)$ may be seen as the shortest distance between the hyperbola generated by the sensor pairs' measurements (as in FIG. 2A) and the hyperbola that goes through $(x_i, y_j)$, as illustrated in FIG. 7A.

In location systems which generate circles of probable locations for the emitter (e.g., in TOA systems and RSS systems employing power ratios), the residual at location $(x_i, y_j)$ for a sensor 110 is defined as:

$$R_{110} = |d_{110} - r_{110}| \quad (6)$$

where $d_{110}$ is the distance between the circle center and the point $(x_i, y_j)$, and r110 is the radius of the circle, as illustrated in FIG. 7B.

Formally, in the case of hyperbola systems (e.g., TDOA systems) the likelihood function for any sensor pair (p, q) may be computed as:

$$l_{p,q}(x,y) = e^{-sR_{p,q}(x,y)} \quad (7)$$

where s is a constant. Note that there are other possible likelihood functions. Another exemplary likelihood function is:

$$l_{p,q}(x, y) = \frac{1}{sR_{p,q}(x, y)} \quad (8)$$

The total likelihood function is the sum over all unique sensor pairs (p, q):

$$L(x, y) = \sum_{p,q} l_{p,q}(x, y) \quad (9)$$

An estimated location of the emitter may be determined as the location where the peak or maximum value of equation (9) is found.

FIG. 8A illustrates an example of a graphical plot of a likelihood function for one pair of sensors 140 and 150 among a plurality of sensors 110, 120, 130, 140 and 150 employing a TDOA location algorithm. The original hyperbola 810 lies along the peak of a surface defined by the likelihood function, and denotes the locations having the maximum likelihood of being the actual location for emitter 105. In FIG. 8A, the hyperbola is "spread out" to denote non-zero probability away from the original hyperbola 810. In the example illustrated in FIG. 8A, the hyperbola 810 from the sensor pair 140 & 150 has a significant error with respect to the actual location of emitter 105. In general, this error may be reduced by generating likelihood functions for a large number of unique sensor pairs, and then determining a total likelihood function based on all of the likelihood functions, for example using equation (9) above.

FIG. 8B illustrates a graphical plot of a total likelihood function generated from combining likelihood functions from ten (10) sensor pairs: 110/120, 110/130, 110/140, 110/150, 120/130, 120/140, 120/150, 130/140, 130/150 and 140/150. The estimated location of emitter 105 (e.g., the location where the peak or maximum value of equation (9) is found) is illustrated in FIG. 8B as 820. As can be seen in FIG. 8B, the location 820 has a significant error with respect to the actual location of emitter 105, which may be a result of one or more of the various error factors described above (noise, multipath, blocked signals, timing errors, etc.).

As described above, a function (e.g., equation (7)) based on residual values (e.g., equations (5) and (6)) is employed to construct and graph likelihood functions for the location of the emitter over a set of grid points, and the likelihood functions from a plurality of sensors or sensor pairs may then be combined to determine an estimated location of the emitter.

Beneficially, residual values may also be employed to improve the accuracy of algorithms for determining the location of a signal emitter, as described below.

Given an estimate of the emitter location (xi, yj), the residual describes the difference between that estimate, and the estimated location data from a single sensor or sensor pair. In this context, the residual provides a backward looking metric which illustrates how well each of the individual sets of estimated likelihood data (e.g., equation (7)) match the overall likelihood data (e.g., equation (9)).

This information is useful in helping to identify which sensor(s) or sensor pair(s) may be corrupted by bad data. If a particular sensor has a blocked direct path to the emitter, for example, it may be expected that the timing and/or power information from that sensor is compromised. In such cases, the data from that sensor may exhibit large residual values, and thus be identified as inconsistent with the estimated location data from other sensors or sensor pairs.

Once an estimate is made of the consistency among the different sensors or sensor pairs, a next step is to recalculate the combined likelihood function (e.g., in equation (9)) by first weighting the estimated location data set from each sensor or sensor pair according to its consistency as measured by the residual values for the sensor or sensor pair. In the above example, the data from a sensor with a blocked direct path would be only lightly weighted, thus minimizing its contribution. In one embodiment, a weighted version of equation (9) is calculated as:

$$L(x, y) = \sum_{p,q} w_{p,q} l_{p,q}(x, y) \tag{10}$$

where w is a weighting function related to the residual, and the individual likelihood functions are as they were calculated before.

In one embodiment, the weighting function may be chosen as:

$$w = e^{-kR} \tag{11}$$

where k is a constant. In another embodiment, the weighting function may be:

$$w = \frac{1}{kR} \tag{12}$$

Other weighting functions may be employed but, beneficially, the weighting function is inversely proportional to residual value. In another embodiment, the weighting function may include the geometric dilution of precision (GDOP).

Once a new estimated location is determined with respect to equation (10), beneficially the process may be iterated by: (1) recalculating the residual values for all sensors or sensor pairs with respect to new estimated location; (2) calculating new weighting function based on the residuals; and (3) recalculating a new estimated location using equation (10).

Figure 9:
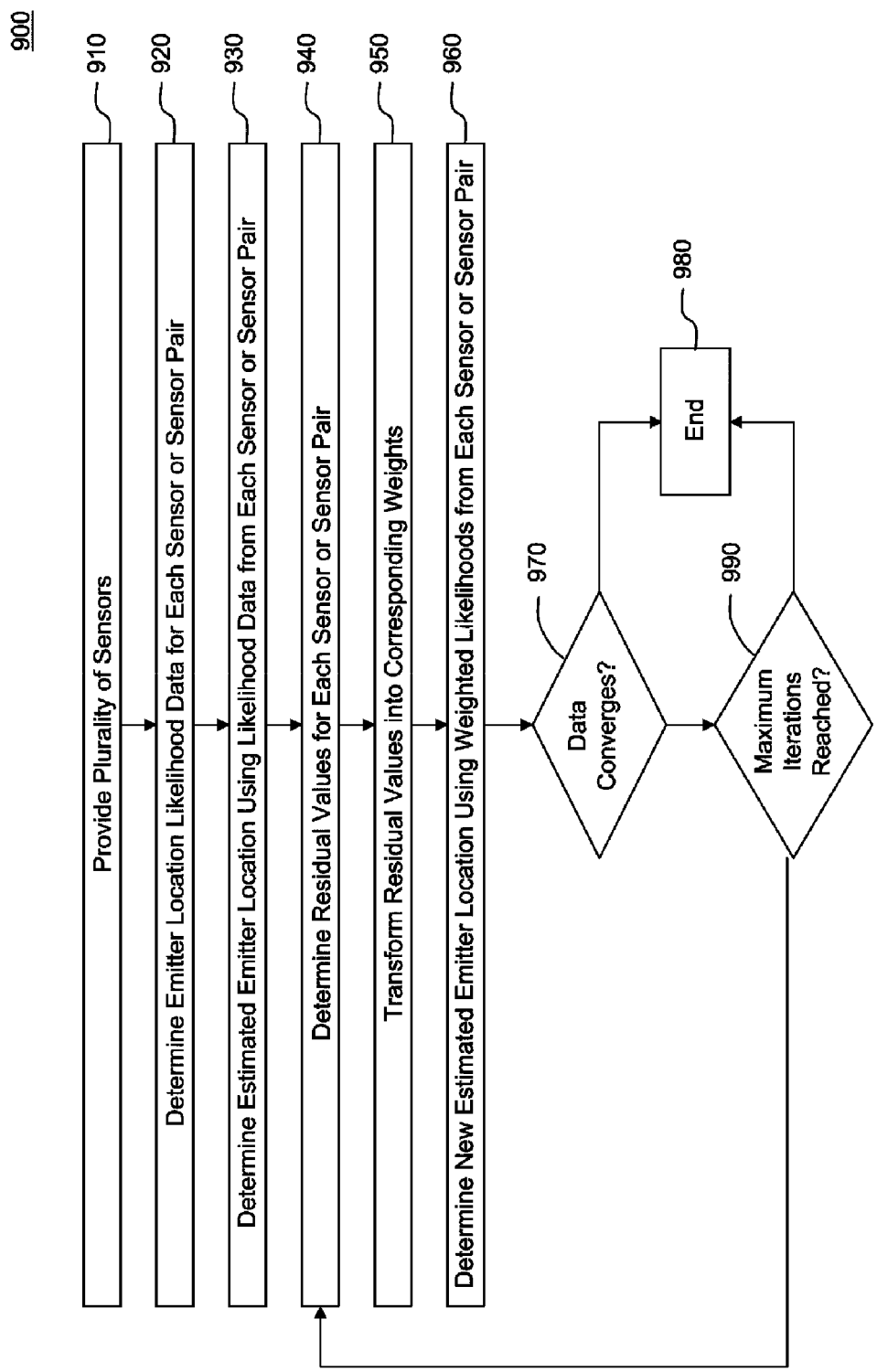
FIG. 9 is a flowchart illustrating one embodiment of a method of locating an emitter using signals received at multiple sensors.

FIG. 9 shows a flowchart of one embodiment of a method 900 of locating a signal emitter.

In a step 910 a system provides a plurality of sensors (e.g., sensor 600).

In a step 920 a processor (e.g., processor 40 and/or processor(s) 620) determines emitter location likelihood data for each sensor or sensor pair.

In a step 930 a processor (e.g., processor 40 and/or processor(s) 620) determines an estimated emitter location using the likelihood data from each sensor or sensor pair.

In a step 940 a processor (e.g., processor 40 and/or processor(s) 620) determines residual values for each sensor or sensor pair.

In a step 950 a processor (e.g., processor 40 and/or processor(s) 620) transforms the residual values into corresponding weights.

In a step 960 a processor (e.g., processor 40 and/or processor(s) 620) determines a new estimated emitter location using the weighted likelihood data from each sensor or sensor pair.

In a step 970 a processor (e.g., processor 40 and/or processor(s) 620) determines whether or not the weighted likelihood data has converged. Beneficially, convergence may be determined to have occurred when the difference between a previous estimated location of the emitter and an updated estimated location of the emitter is less than a predetermined convergence threshold value. If the data is determined to have converged, then the process 900 ends at step 980.

Otherwise, if the data has not converged, then in a step 990 a processor (e.g., processor 40 and/or processor(s) 620) determines whether a maximum number of iterations have been performed. Beneficially, when the number of iterations equals a predetermined maximum permitted number of iterations, then the process 900 ends at step 980.

Otherwise, the process returns to step 940 and another iteration is performed.

Figure 10:
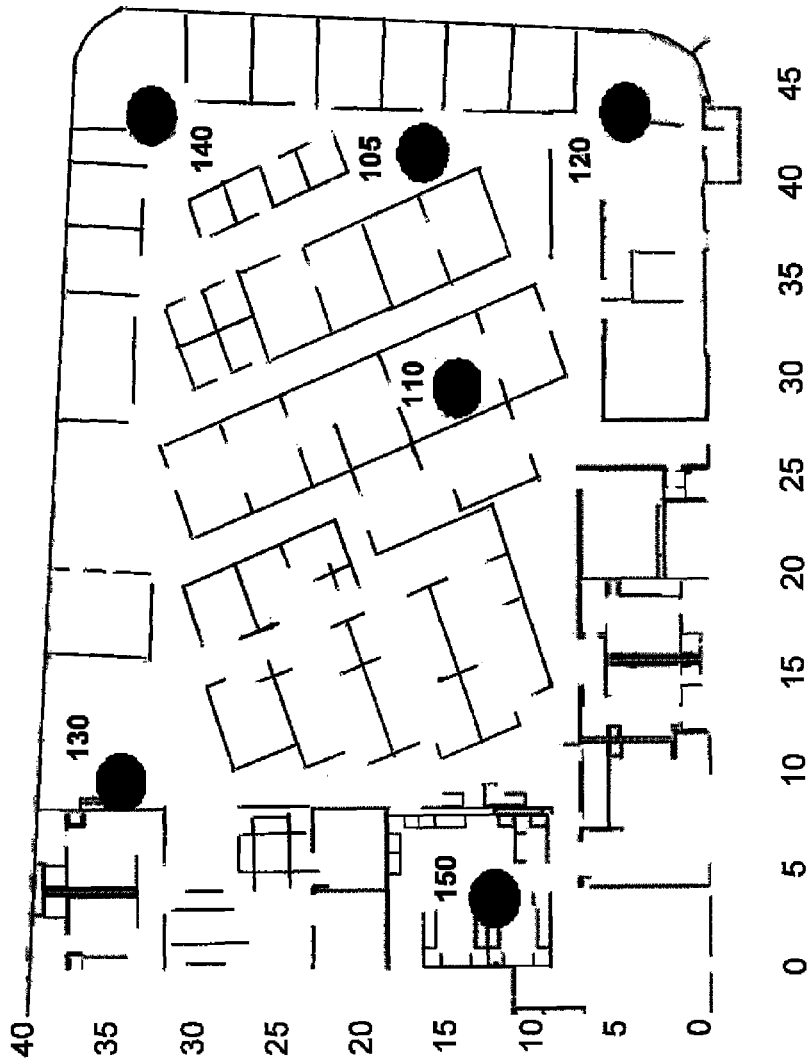
FIG. 10 illustrates an exemplary building floor-plan and sensor layout.

FIG. 10 illustrates an exemplary building floor-plan and sensor layout that was employed to test the effectiveness of an exemplary embodiment of an iterative emitter location algorithm that employs weighting based on residual values. Approximately 300 measurements were made while varying the following parameters: emitter location, transmitted power, and transmitted signal bandwidth. For the measurements, the weighting function of equation 11 were employed, with k=5. Both RSS and time-based algorithms were employed. Table 1 show that, in this particular example, the disclosed algorithm performed better than either the power or time-based measurements alone.

TABLE 1

| Measurement Algorithm | Mean Error |
| --- | --- |
| Iterative Residual Weighting | 10.5 m |
| RSS | 12.2 m |
| TDOA | 20.0 m |

In the embodiment described above, the residual function is used as a means of constructing a graphical likelihood function over a set of grid points. The residual may also be used for another purpose: Given an estimate of the emitter location (x, y), the residual describes the difference between that estimate, and the estimates from a single receiver or receiver pair. In this context, the residual provides a backward looking metric which illustrates how well the individual solutions (e.g., equations (7) or (8) above) match the overall solution (e.g., equation (9) above). This idea can be formalized by defining the concept of the total residual as:

$$R_t(x_e, y_e) = \sqrt{\sum_{p,q} R_{p,q}^2(x_e, y_e)} \tag{13}$$

where $(x_e, y_e)$ is an estimate of the receiver location. When $R_t$ is small it is an indication that all of the receivers or receiver pairs are consistent with the global solution.

As noted above, one of the biggest challenges in geolocation is multipath interference. When the bandwidth of the emitter is sufficiently high, the presence of multipath creates multiple echoes at the receiver.

Figure 11:
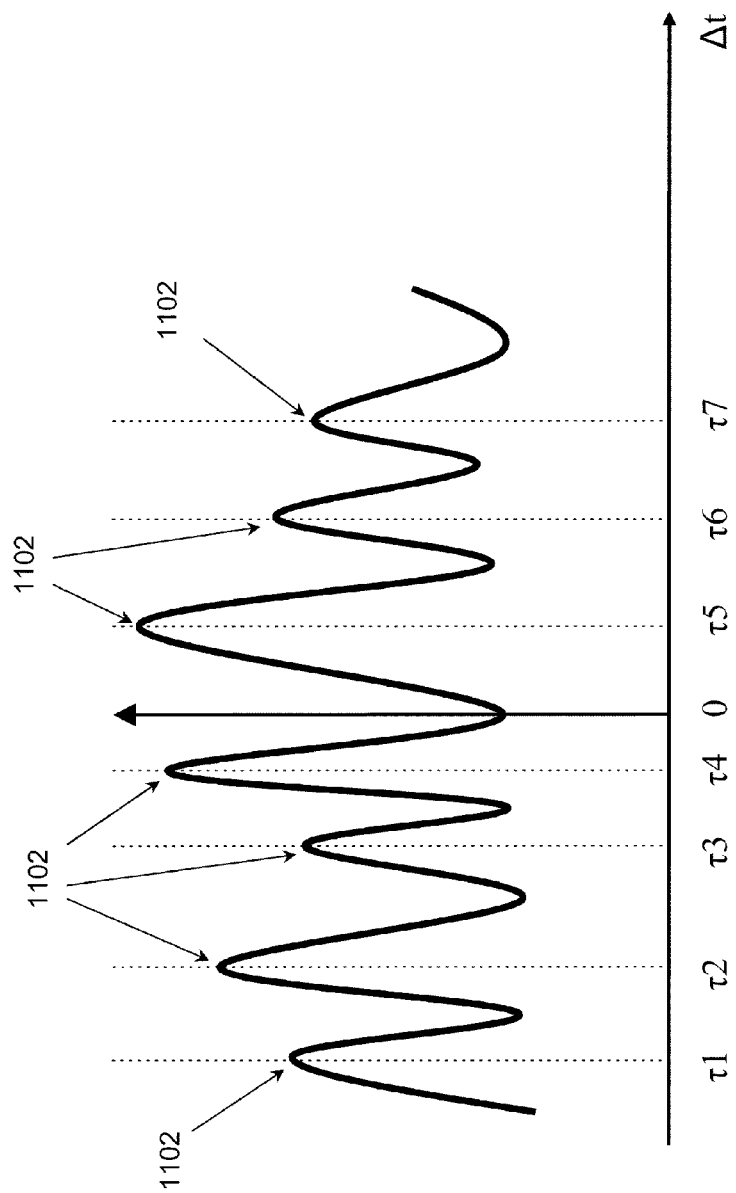
FIG. 11 illustrates an example of cross-correlation data between two sensors or receivers in the presence of strong multipath echoes.

FIG. 11 illustrates an example of cross-correlation data between two sensors or receivers in the presence of strong multipath echoes. As shown in FIG. 11, the cross-correlation data has multiple peaks 1102.

In the example embodiments described above, the residual is computed by selecting the delay which has the strongest peak in the cross-correlation data. For example, note that when the residual was calculated according to equation (5) which employed time-difference of arrival $\tau_{110,120}$ for the two sensors as determined by the location of the peak in the cross-correlation data. In the example embodiment described with respect to FIG. 9, for example, the residual is computed using the largest peak in the cross-correlation data. Since conventional wisdom suggests that the strongest peak is often the one that results from the direct path, or line-of-sight propagation between emitter and receivers, this can often lead to good results. For example, in FIG. 11, in the embodiments described above, τ5 would be chosen to compute the residual.

In the presence of severe multipath, however, the strongest peak may not necessarily correspond to the direct path, since the direct path may be blocked or partially blocked.

Figure 12:
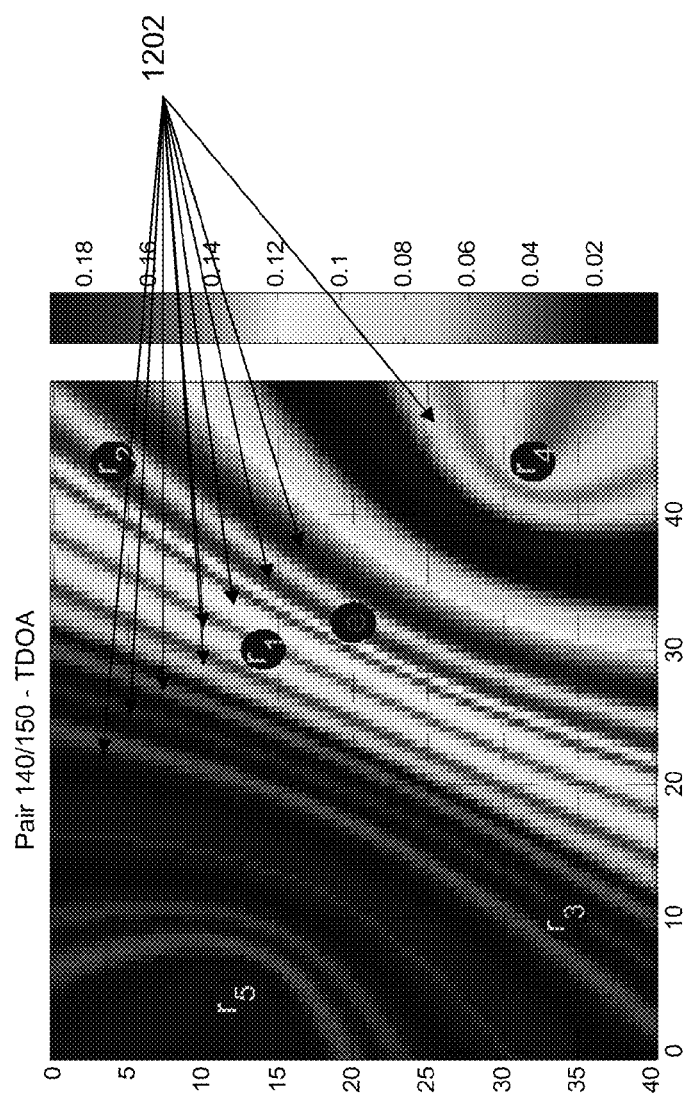
FIG. 12 illustrates an example plot of a likelihood function for a TDOA cross correlation of data from two sensors in a case where there are multiple peaks in the cross-correlation data because of multipath echoes.

If we construct a likelihood function using all the peaks in the cross-correlation data, it includes multiple hyperbola-like peaks. FIG. 12 illustrates an example plot of a likelihood function for a TDOA cross-correlation of data from two sensors (e.g., sensors 140 and 150 in FIG. 10) in a case where there are multiple peaks in the cross-correlation data because of multipath echoes.

Figure 13:
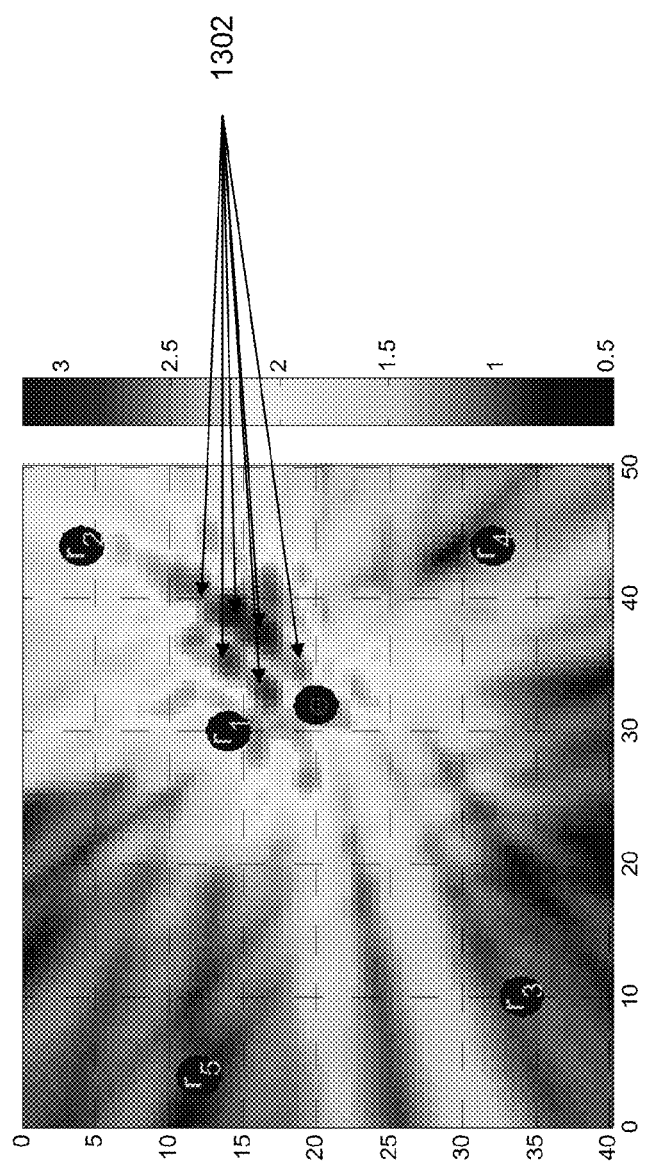
FIG. 13 illustrates an example plot of a total likelihood function for multiple sensors in a case where there are multiple peaks in the cross-correlation data because of multipath echoes.

When the likelihood functions between pairs of sensors have multiple hyperbola-like peaks, then the total likelihood function contains multiple peaks. FIG. 13 illustrates an example plot of a total likelihood function for multiple sensors (e.g., sensors 110, 120, 130, 140 and 150 as shown in FIG. 10) in a case where there are multiple peaks in the cross-correlation data because of multipath echoes. As can be seen from FIG. 13, there are multiple peaks in the total likelihood function, and it is not clear which one is correct. On the other hand, if we assume that most of the data is good, then there is good reason to believe that one of the peaks is close to the emitter. The problem then becomes trying to identify the peak in FIG. 13 that represents the best estimate of the most likely estimate of the emitter's location.

We now describe below two sets of strategies for identifying peaks in cross-correlation data to minimize the residual.

A first strategy for selecting the peaks in the cross-correlation function to be used in the geolocation algorithm begins by recognizing that a residual can be defined with respect to each peak in the cross correlation data. In this strategy, however, we define the residual with respect to any peak in the cross-correlation data. Thus, each receiver or receiver pair may have several possible likelihood functions. For example, the cross-correlation data in FIG. 11 has seven different peaks, which means that there are seven different likelihood functions that could be computed using equation (7). If each sensor pair has several possible likelihood functions, then there are many possible solutions that can be constructed using equation (9).

In one possible embodiment, all possible combinations of cross-correlation peaks from each receiver pair could be considered. For example, one combination might use the second peak from the cross-correlation data of receivers 1 and 2, the fourth peak from the cross-correlation data of receivers 1 and 3, and the fifth peak from the cross-correlation data of receivers 1 and 3. The total residual in equation (13) may then be computed for each combination, and the final solution will be chosen as the combination which has the smallest total residual. This ensures that the final graph is the one which uses data that is the most self-consistent. As before, once the total likelihood function is determined, the emitter's location is estimated to be the point corresponding to the peak value of the total likelihood function.

Unfortunately, even with a moderate number of receivers and cross-correlation peaks, the total number of combinations quickly becomes very large, and an exhaustive search consumes a lot of processing bandwidth and time.

To address this, optimization methods from the mathematical community may be employed which are designed to find global extremes without searching the entire space. A wide variety of such optimization algorithms may be employed.

In a beneficial embodiment a genetic optimization algorithm is employed to determine an optimal solution of which peaks to use in each of the cross-correlation data sets to calculate the total likelihood function.

Genetic algorithms are based on the idea of "chromosomes," which in this context represent a possible solution to the problem. A fitness score is assigned to each chromosome, based on how well it solves the problem. A set of chromosomes can exchange information with each other, and can be randomly mutated, with the intent of evolving into an optimal solution. To give an example, earlier a random combination was selected as the second peak from the cross-correlation data of receivers 1 and 2, the fourth peak from the cross-correlation data of receivers 1 and 3, and the fifth peak from the cross-correlation data of receivers 1 and 3. The corresponding chromosome from this example may be labeled [2, 4, 5]. There is one number in the array for each receiver pair, denoting which peak in its cross-correlation data that is chosen.

Further details about the mechanics of executing a genetic optimization algorithm are described, for example, by David E. Goldberg, "GENETIC ALGORITHMS IN SEARCH, OPTIMIZATION, AND MACHINE LEARNING," Addison-Wesley (1989).

Although the specific embodiment of an approach that determines minimum total residuals has been described above for a case where cross-correlation data (e.g., TDOA data) from pairs of sensors is employed, it should be understood that the principles can also be applied to a case where data from a single sensor is processed to generate the residuals, as described above with respect to FIG. 7B.

A second strategy may also be used to determine which peaks to choose. In this second strategy, for a given receiver pair (p,q), a different peak may be chosen at each location (x,y). The peak chosen is the one which minimizes the local residual at (x,y) using equation (5), rather than the one which optimizes the total residual in equation (13). This approach requires significantly less computation.

This strategy chooses a cross correlation peak adaptively, based on how close a peak is to the grid point (x, y), and on how large the peak is. In a specific embodiment, for sensor pair (p, q), at each grid point (x, y) a peak K(x, y) in the cross correlation data is chosen if it satisfies the minimum residual criterion:

$$K(x, y) = \underset{k}{\operatorname{argmin}}(z_k r_k(x, y)) \tag{14}$$

where $z_k$ is the magnitude of the $k^{th}$ peak in the cross-correlation data, and $r_k(x, y)$ is the residual for that $k^{th}$ peak at grid point (x, y), as defined in equation (5) above. Thus, $r_K(x, y)$ is defined as the minimum residual for the cross correlation data at grid point (x, y), and K(x, y) is the peak that produces that minimum residual at grid point (x, y).

In this case, the likelihood function for the cross correlation data for sensor pair (p, q) becomes, from equation (7) above:

$$l_{p,q}(x,y) = e^{-s r K_{p,q}(x,y)} \tag{15}$$

It should be understood that other minimum residual criteria may be employed instead of equation (14).

From the individual likelihood functions for reach sensor pair (p, q), the total likelihood function may be computed using equation (9) above.

In another embodiment, a weighted sum of the individual likelihood functions is employed instead using equation (16), below.

$$L(x, y) = \sum_{p,q} w_{p,q}(x, y) l_{p,q}(x, y) \quad (16)$$

In that case, in one embodiment the weight function $w_{p,q}(x,y)$ for each sensor pair (p, q) may be set equal to the magnitude of the peak, K(x, y), chosen for grid point (x, y) for sensor pair (p, q) using equation (14) above. In other embodiments, other weighting functions (e.g., geometrical dilution of precision (GDOP)) may be employed instead In still other embodiments, the total likelihood function may be computed using alternative norms, such as the sum-of-squares norm:

$$L(x, y) = \sqrt{\sum_{p,q} w_{p,q}(x, y) l^2_{p,q}(x, y)} \quad (17)$$

So, according to this first strategy, for each sensor pair (p, q) and for each point on the grid, (x, y), first a cross correlation peak is identified which yields a minimum peak according to some criterion, for example according to equation (14) above. This is repeated for each unique pair of sensors in the system. Then, the total likelihood function for all sensors is computer using the individual likelihood functions of each receiver pair. Finally, the emitter location is determined as the point of maximum likelihood for the total likelihood function.

Figure 14:
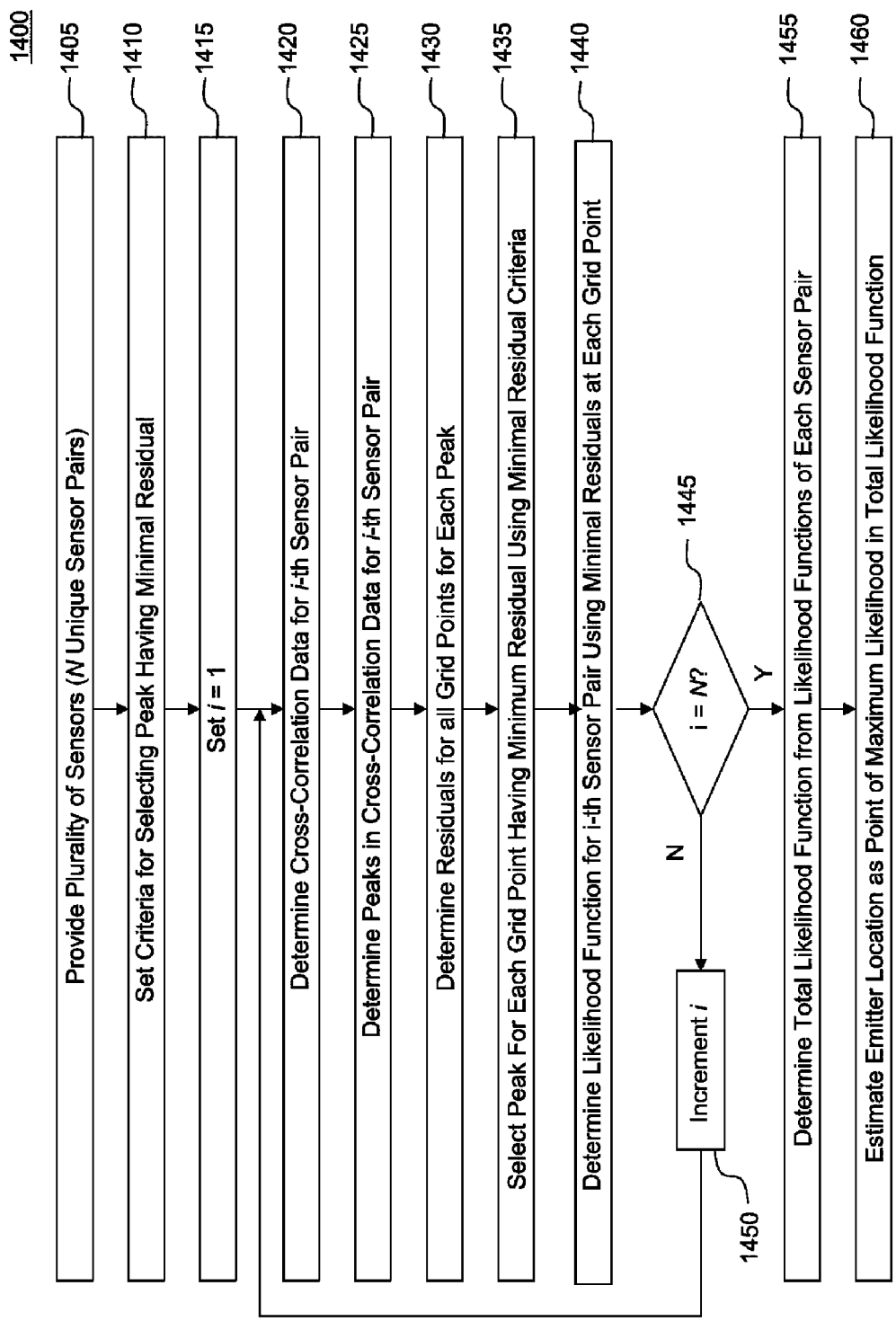
FIG. 14 shows a flowchart of one embodiment of a method of locating a signal emitter.

FIG. 14 shows a flowchart of one embodiment of a method 1400 of locating a signal emitter according to this first strategy.

In a step 1405 a system provides a plurality of sensors (e.g., sensor 600). The sensors provide for a plurality, N, of unique sensor pairs.

In a step 1410 a minimal residual criteria is set for selecting a peak in cross correlation data having multiple peaks that will be used for determining a likelihood function. The criteria may be selected by a designer of a geolocation system (e.g., system 10) that executes the method 1400. In one embodiment, the criteria may be the evaluation of equation (14) above. The minimal residual criteria may be provided via software algorithm stored as executable code in a memory (e.g., 45 or 630) associated with a processor (e.g., processor 40 and/or processor(s) 620) that executes one or more subsequent steps of method 1400.

Of course it is understood that steps 1405 and 1410 are preparatory steps and it is not to be implied from this description of FIG. 14 that they are performed in any particular order.

In a step 1415 an index i is set to one to correspond to be one to correspond to the first sensor pair whose data is to be processed. In the embodiment shown in FIG. 14, for ease of explanation data for each of the sensor pairs is shown as being processed serially. However it should be understood that in other embodiments, some or all of the data for the unique sensor pairs could be processed in parallel with each other.

In a step 1420 one or more processors (e.g., processor 40 and/or processor(s) 620) determine cross correlation data (e.g., TDOA cross correlation data) for sensor pair i.

In a step 1425 a processor (e.g., processor 40 and/or processor(s) 620) determines peaks in the cross-correlation data for sensor pair i. The processor may qualify a data point as being a peak by comparing the magnitude of the data point to the magnitude of neighboring data points. In some embodiments, the magnitude of a data point must be greater than the magnitude of neighboring data points by a predetermined amount or percentage to avoid an excess number of false peaks being triggered by noise in the data set.

In a step 1430 a processor (e.g., processor 40 and/or processor(s) 620) determines the residuals at each point in the grid for each peak, for example, using equation (5).

In a step 1435 a processor (e.g., processor 40 and/or processor(s) 620) selects a peak K for each point in the grid that exhibits the minimum residual using the minimum residual criteria established in step 1410.

In a step 1440, the likelihood function for sensor pair i is determined for the peak selected in step 1435, for example using equation (15).

In a step 1445, it is determined whether data from all unique sensor pairs has been processed. If not, then in step 1450 the index i is incremented, and the process returns to step 1420 to process the data for the next unique sensor pair.

Once N unique sensor pairs have been processed, then in a step 1455 the total likelihood function is determined from the individual likelihood functions for each unique sensor pair, for example, using equation (9), (16) or (17).

Finally, in a step 1460, the location of the emitter is estimated as the point where the total likelihood function has its maximum value.

Although a specific embodiment has been described above with respect to FIG. 14 for a case cross-correlation data (e.g., TDOA data) from pairs of sensors is employed, it should be understood that the principles can also be applied to a case where data from a single sensor is processed to generate the residuals, as described above with respect to FIG. 7B.

While example embodiments are disclosed herein, one of ordinary skill in the art appreciates that many variations that are in accordance with the present teachings are possible and remain within the scope of the appended claims. In particular, some exemplary embodiments were described above with respect to RF or microwave emitters and sensors. However, the principles set forth above can be applied to a variety of different signals other than RF or microwave signals, including other electromagnetic signals, and acoustic signals. Also, the propagation models used need not be free-space. Ideally path loss models that are employed match the environment in which the sensor system is deployed. In addition, the description above describes things in two dimensions, but the principles could be generalized to three dimensions. For example, in a case employing TOA, a solution in three dimensions is the volume of intersection of several spherical surfaces. The invention therefore is not to be restricted except within the scope of the appended claims.

The invention claimed is:

1. A method of determining a location of a signal emitter, comprising:
   providing at least three sensors separated and spaced apart from each other;
   receiving a signal from the emitter at each of the sensors;
   determining cross-correlation data for the received signals at sensor pairs;
   identifying peaks in the cross-correlation data for each of the sensor pairs;
   for each sensor pair:
      selecting, at each point in a grid, a peak in the cross-correlation data that generates a minimum residual according to a selected minimum residual criterion, and
      using the selected peak in the cross-correlation data for each point in the grid to calculate a likelihood function for the sensor pair;

determining a total likelihood function for the sensors using the likelihood functions calculated for each sensor pair; and determining the location of the emitter as a point where the total likelihood function has a maximum value.

2. The method of claim 1, wherein selecting, at each point in the grid, the peak in the cross-correlation data that generates the minimum residual according to the selected minimum residual criterion comprises selecting the peak as $$K(x, y) = \operatorname*{argmin}_{m}(z_m r_m(x, y)),$$

where $z_m$ is a magnitude of the $m^{th}$ peak in the cross-correlation data, $r_m(x, y)$ is a residual for that $m^{th}$ peak at grid point $(x, y)$, and $K(x, y)$ is the selected peak that generates the minimum residual at grid point $(x, y)$.

3. The method of claim 1, wherein using the selected peak in the cross-correlation data for each point in the grid to calculate the likelihood function for the sensor pair comprises calculating $l_{p,q}(x,y) = e^{-s r_{K,p,q}(x,y)}$, wherein p and q are indices identifying each sensor pair (p, q), s is a constant, and $r_K(x, y)$ is the minimum residual at grid point $(x, y)$ for the selected peak K.

4. The method of claim 1, wherein determining a total likelihood function for the sensors comprises calculating $$L(x, y) = \sum_{p,q} l_{p,q}(x, y)$$

wherein p and q are indices identifying each sensor pair (p, q), and $l_{p,q}(x, y)$ is the likelihood function for sensor pair (p, q) at grid point (x, y).

5. The method of claim 1, wherein determining a total likelihood function for the sensors comprises calculating $$L(x, y) = \sum_{p,q} l_{p,q}(x, y)$$

wherein p and q are indices identifying each sensor pair (p, q), and $l_{p,q}(x, y)$ is the likelihood function for sensor pair (p, q) at grid point (x, y).

6. The method of claim 1, wherein determining a total likelihood function for the sensors comprises calculating $$L(x, y) = \sum_{p,q} w_{p,q}(x, y) l_{p,q}(x, y)$$

wherein p and q are indices identifying each sensor pair (p, q), $l_{p,q}(x, y)$ is the likelihood function for sensor pair (p, q) at grid point (x, y), and $w_{p,q}(x, y)$ is a weighting function applied to each likelihood function at each grid point (x, y).

7. The method of claim 6, where $w_{p,q}(x, y)$ is equal to magnitude of the peak, $K(x, y)$, chosen for grid point $(x, y)$ for sensor pair $(p, q)$.

8. A method of determining a location of a signal emitter, comprising:

providing at least three sensors separated and spaced apart from each other;

receiving a signal from the emitter at each of the sensors;

determining cross-correlation data for the received signals at sensor pairs;

identifying peaks in the cross-correlation data for each of the sensor pairs;

determining a combination of the peaks from the cross-correlation data for the sensor pairs that produces a minimum total residual;

determining a likelihood function for each sensor pair using the selected peak from the cross-correlation data;

determining a total likelihood function for the sensors using the likelihood functions for each sensor pair; and determining the location of the emitter as a point where the total likelihood function has a maximum value.

9. The method of claim 8, wherein determining the combination of the peaks from the cross-correlation data for the sensor pairs that produces the minimum total residual includes executing a global optimization algorithm.

10. The method of claim 8, wherein determining the combination of the peaks from the cross-correlation data for the sensor pairs that produces the minimum total residual includes executing a genetic optimization algorithm.

11. The method of claim 8, wherein determining a total likelihood function for the sensors comprises calculating $$L(x, y) = \sum_{p,q} l_{p,q}(x, y)$$

wherein p and q are indices identifying each sensor pair (p, q), and $l_{p,q}(x, y)$ is the likelihood function for sensor pair (p, q) at grid point (x, y).

12. The method of claim 8, wherein determining a total likelihood function for the sensors comprises calculating $$L(x, y) = \sum_{p,q} l_{p,q}(x, y)$$

wherein p and q are indices identifying each sensor pair (p, q), and $l_{p,q}(x, y)$ is the likelihood function for sensor pair (p, q) at grid point (x, y).

13. The method of claim 8, wherein determining a total likelihood function for the sensors comprises calculating $$L(x, y) = \sum_{p,q} w_{p,q} l_{p,q}(x, y)$$

wherein p and q are indices identifying each sensor pair (p, q), $l_{p,q}(x, y)$ is the likelihood function for sensor pair (p, q) at grid point (x, y), and $w_{p,q}$ is a weighting function.

14. A system for determining a location of a signal emitter, the system comprising:

at least three sensors separated and spaced apart from each other, each of the sensors including a receiver adapted to receive the signal emitted by the first device;

a network connecting the sensors and adapted to communicate data from the sensors; and a processor programmed to execute an algorithm comprising:

determining cross-correlation data for signals at sensor pairs, identifying peaks in the cross-correlation data for each of the sensor pairs, for each sensor pair, selecting a peak in the cross-correlation data, determining an individual likelihood function for each sensor pair, determining a total likelihood function for the sensors using the individual likelihood functions for each sensor pair, and determining the location of the emitter as a point where the total likelihood function has a maximum value, wherein the individual likelihood function for each sensor pair is determined by one of: (1) selecting at each point in a grid, a peak in the cross-correlation data for the sensor pair that generates a minimum residual according to a selected minimum residual criterion, and using the selected peak in the cross-correlation data for each point in the grid to calculate the individual likelihood function; and (2) determining a combination of the peaks from the cross-correlation data for the sensor pairs that produces a minimum total residual, and determining a likelihood function for each sensor pair using the selected peak from the cross-correlation data for that sensor pair.

15. The system of claim 14, wherein determining the individual likelihood function for each sensor pair comprises:

selecting, at each point in the grid, a peak in the cross-correlation data for the sensor pair that generates a minimum residual according to a selected minimum residual criterion; and determining the likelihood function for each sensor pair using the selected peak in the cross-correlation data for each point in the grid.

16. The method of claim 15, wherein selecting at each point in the grid, a peak in the cross-correlation data that generates a minimum residual according to a selected minimum residual criterion, comprises selecting the peak as $$K(x, y) = \underset{m}{\mathrm{argmin}}(z_m r_m(x, y)),$$

where $z_m$ is a magnitude of the $m^{th}$ peak in the cross-correlation data, $r_m(x, y)$ is a residual for that $m^{th}$ peak at grid point $(x, y)$, and $K(x, y)$ is the selected peak that generates that minimum residual at grid point $(x, y)$.

17. The method of claim 15, wherein using the selected peak in the cross-correlation data for each point in the grid to calculate the individual likelihood function comprises calculating $l_{p,q}(x,y)=e^{-sr_{K_{p,q}}(x,y)}$, wherein p and q are indices identifying each sensor pair (p, q), s is a constant, and $r_K(x, y)$ is the minimum residual at grid point $(x, y)$ for the selected peak K.

18. The system of claim 14, wherein determining the individual likelihood function for each sensor pair comprises:

determining the combination of the peaks from the cross-correlation data for the sensor pairs that produces the minimum total residual, and determining the likelihood function for each sensor pair using the selected peak from the cross-correlation data for that sensor pair.

19. The method of claim 18, wherein determining the combination of the peaks from the cross-correlation data for the sensor pairs that produces the minimum total residual includes executing a global optimization algorithm.

20. The method of claim 18, wherein determining the combination of the peaks from the cross-correlation data for the sensor pairs that produces the minimum total residual includes executing a genetic optimization algorithm.

* * * * *

UNITED STATES PATENT AND TRADEMARK OFFICE
CERTIFICATE OF CORRECTION

| | | |
|---|---|---|
| PATENT NO. | : 8,098,200 B1 | Page 1 of 1 |
| APPLICATION NO. | : 12/539760 | |
| DATED | : January 17, 2012 | |
| INVENTOR(S) | : David L. Gines | |

It is certified that error appears in the above-identified patent and that said Letters Patent is hereby corrected as shown below:

On the title page, in field (63), under "Related U.S. Application Data", in column 1, line 2, delete "abandoned," and insert -- Pat. No. 8,049,668, --, therefor.

Signed and Sealed this

Thirteenth Day of March, 2012

David J. Kappos
*Director of the United States Patent and Trademark Office*